(12) United States Patent
Hurter et al.

(10) Patent No.: US 10,217,295 B2
(45) Date of Patent: Feb. 26, 2019

(54) SELECTIVE DISPLAY IN A COMPUTER GENERATED ENVIRONMENT

(71) Applicant: ECOLE NATIONALE DE L'AVIATION CIVILE, Toulouse (FR)

(72) Inventors: Christophe Hurter, Toulouse (FR); Michael Traoré Sompagnimdi, Toulouse (FR)

(73) Assignee: ECOLE NATIONALE DE L'AVIATION CIVILE, Toulouse (FR)

( * ) Notice: Subject to any disclaimer, the term of this patent is extended or adjusted under 35 U.S.C. 154(b) by 0 days.

(21) Appl. No.: 15/485,828

(22) Filed: Apr. 12, 2017

(65) Prior Publication Data

US 2017/0301147 A1   Oct. 19, 2017

(30) Foreign Application Priority Data

Apr. 15, 2016   (EP) .................................... 16305437

(51) Int. Cl.
*G06T 17/00*   (2006.01)
*G06T 19/20*   (2011.01)
(Continued)

(52) U.S. Cl.
CPC .............. *G06T 19/20* (2013.01); *G06T 15/08* (2013.01); *G06T 15/205* (2013.01); *G06T 2219/2016* (2013.01)

(58) Field of Classification Search
CPC ....... G06T 15/08; G06T 15/30; G06T 15/205; G06T 19/20
See application file for complete search history.

(56) References Cited

U.S. PATENT DOCUMENTS 9,082,217 B1 *   7/2015   McKenzie .............. G06T 15/06
2007/0206027 A1 *   9/2007   Chen ....................... G06T 15/30
345/620

FOREIGN PATENT DOCUMENTS

WO   2010145016 A1   12/2010
WO   2011011894 A1   2/2011

OTHER PUBLICATIONS

European Search Report for 16305437.2 dated Sep. 27, 2016.
(Continued)

*Primary Examiner* — Charles Tseng
(74) *Attorney, Agent, or Firm* — Meagher Emanuel Laks Goldberg & Liao, LLP

(57) ABSTRACT

To better explore a virtual 3d computer generated environment comprised of objects which may be voxels, polygons or any other construct are selectively not displayed so as to better reveal underlying objects. The objects are each associated with a metadata value which contributes to determining their visibility such as a density or opacity value. The manner of selection is somewhat analogous to the projection of a beam of light towards the objects from a virtual projector, where a display threshold is determined for each object within the field of view of said virtual projector on the basis of a display function having an inverse relation to distance from the virtual projector and further varying as a function of the angle defined by the orientation of the virtual projector and a line drawn from said virtual projector to each said object respectively. On this basis, objects having a smaller angular separation from the axis of the virtual projector, and closer to the projector, will be preferentially excluded from display.

14 Claims, 12 Drawing Sheets

(51) Int. Cl.
*G06T 15/08* (2011.01)
*G06T 15/20* (2011.01)

(56) References Cited

OTHER PUBLICATIONS

Nicholas Joseph Jr.: "Cardinal Principles of Radiation Protection", 2006, pp. 1-38, XP002761960, Retrieved from the Internet: URL:https://www.ceessentials.net/article4.htm.

* cited by examiner

SELECTIVE DISPLAY IN A COMPUTER GENERATED ENVIRONMENT

FIELD OF THE INVENTION

The present invention relates to the assisted exploration of computer generated virtual environments, and in particular to managing the difficulties associated with densely populated environments.

BACKGROUND OF THE INVENTION

Volumetric datasets are found in many fields, such as engineering, material sciences, medical imaging, astrophysics. The exploration of volumetric datasets is not trivial, often requiring extensive knowledge and is usually heavily impacted by the specific needs of users. In most airports for example, security agents deal with such data exploration in the context of baggage inspections. X-ray and tomography are two commonly used fluoroscopic scanning systems. X-ray systems provide a flattened 2D luggage scan while tomography systems produce transversal scans, also called slices. Thanks to data processing techniques such as the Radon transform, these systems can produce a full 3D scan, comprising a set of voxels with corresponding density data. Since the resulting X-ray scanned image only contains voxel or pixel densities, it cannot display the original material colours. The standard colour visual mapping uses three different colours (orange, green, and blue) to display the data density. Orange colour corresponds to low density (mainly organic items). In opposition, blue colour is used for high density values (i.e. metal). In the case of X-ray systems, green colour corresponds to the superposition of different kinds of materials or average density materials.

FIG. 1 demonstrates some of the ways in which an article may be obscured in a scan. As shown in FIG. 1, the displayed 2D scanned image can suffer from four issues:

Superposition:

A threat (e.g. prohibited object like knife, cutter . . . ) may be sheltered behind dense materials. Sometimes, it's possible to see through this blind shield using functionalities such as high penetration (enhanced X-ray power) or image processing (contrast improvement). As shown in FIG. 1, the umbrella and dense collection of objects in the upper right hand corner 101 may obscure articles of interest.

Location:

Depending on its location inside the luggage, a threat can be difficult to detect. Objects located in the corners, in the edges or inside the luggage's frame are very difficult to identify. As shown in FIG. 1, the retractable trolley bars and the rigid corners of the case 102 may obscure articles of interest.

Dissociation:

Another way to dissimulate a threat is to separate and to spread parts of it in the luggage (weapons or explosives are composed of many separated items like the trigger, the barrel . . . ). This dissociation can be combined with other dissimulation techniques. As shown in FIG. 1, a number of apparently non-descript items 103 are present which are unlikely to attract particular attention, but which may be assembled to form some article of interest.

Lure:

An ill-intentioned individual may use a lure to hide the real threat. For instance, a minor threat like a small scissors may be clearly visible and catch security agent's attention while a more important threat remains hidden. As shown in FIG. 1, the metal rod 104 may attract the attention of the user, drawing it away from some less visible threat.

Volumetric data exploration with direct volume rendering techniques is of great help to visually extract relevant structures in many fields of science: medical imaging, astrophysics and more recently in luggage security. To leverage this knowledge extraction, many techniques have been developed. A number of existing basic technologies are known in this field, including volume visualization, transfer function, direct voxel manipulation and focus plus context interaction.

In particular, volume visualization can be done with geometric rendering system which transforms the data into a set of polygons representing an iso-surface. The contour tree algorithm and other alternatives such as branch decomposition are usually used to find these iso-surfaces. Contour tree algorithms may be vulnerable to noise, which can be problematic in luggage inspections since dense materials such as steel cause noise by reflecting the X-rays.

In order to investigate volumetric dataset, one can use the Transfer Function (TF). In practice, this maps the voxel density with a specific colour (including its transparency). Transfer functions can be 1, 2 or n dimensional and are of great help to isolate structures of interest in volumetric data. Thanks to the colour blending process, a suitable transfer function can also reveal iso-surfaces or hide density to improve the volumetric data visualization.

A specific difficulty that arises in an environment such as that described with respect to FIG. 1 is that the user's view of a particular article or region of interest will often be obscured by materials of no interest. In order to better view the object or region of interest, the user may wish disregard certain such materials so as to achieve an improved view.

SUMMARY OF THE INVENTION

In accordance with a first aspect there is provided a method of displaying objects having a predefined spatial relationship in a three dimensional computer generated environment, said objects each being associated with a respective metadata value defining the respective visibility of said objects in representations thereof, said method comprising the steps of:

defining a virtual projector in said environment having a specified position, orientation and field of view therein, determining a display threshold for each object within the field of view of the virtual projector on the basis of a display function, wherein the display function has an inverse relation to distance from said virtual projector, and wherein said display function further varies as a function of the angle defined by the orientation of the virtual projector and a line drawn from said virtual projector to each object respectively, and displaying objects in said field of view objects excluding those not meeting their respective display threshold.

In accordance with a development of the first aspect, the metadata value represents the density of the respective object.

The selective omission of certain objects enables a user to better and more quickly understand the contents of the environment, which in turn may lead to reduced demands on system capacity.

In accordance with a further development of the first aspect, the objects are voxels In accordance with a further development of the first aspect, the objects are polygons In accordance with a further development of the first aspect, the objects are defined by intersecting surfaces.

The applicability of the mechanisms described to any three dimensional representation makes them compatible with any three dimensional environment, facilitating adoption with the lowest possible adaptation effort.

In accordance with a further development of the first aspect, the display function reflects an inverse square law with respect to distance from the virtual camera. By mirroring physical processes, the behaviour of the mechanism is more intuitive, further enabling a user to better and more quickly understand the contents of the environment, which in turn may lead to reduced demands on system capacity.

In accordance with a further development of the first aspect, the display function tends to a maximum as the angle defined by the axis and each object falls to zero. By imitating common tools, the behaviour of the mechanism is more intuitive, further enabling a user to better and more quickly understand the contents of the environment, which in turn may lead to reduced demands on system capacity.

In accordance with a further development of the first aspect, there are defined a plurality of candidate display functions, and the method comprising the further step of selecting the candidate display function to be applied as the display function. Enabling the user to specify the display function, or automatically selecting an optimal function makes it possible to apply different functions, and select whichever gives the most useful results further enabling a user to better and more quickly understand the contents of the environment, which in turn may lead to reduced demands on system capacity.

In accordance with a further development of the first aspect, the display function comprises a scaling term, and the method comprises the further step of receiving a user input determining the value of the scaling term. Enabling the user to specify the scaling term makes it possible to apply different scaling terms, and select whichever gives the most useful results further enabling a user to better and more quickly understand the contents of the environment, which in turn may lead to reduced demands on system capacity.

In accordance with a further development of the first aspect, there is defined a virtual camera having a specified position, orientation and field of view in the environment, wherein the position is the same as the position of the virtual projector, and the orientation and field of view of the virtual camera are such as to overlap with the field of view of the virtual projector, and wherein at the step of displaying, objects in the field of view of said virtual camera are displayed excluding those not meeting their respective display threshold.

In accordance with a further development of the first aspect, there is provided a further step of receiving a user input determining the orientation, position or field of view of either the virtual camera or the virtual projector. Separate control of the virtual camera and virtual projector opens up new possibilities for exploration of the environment, and inspection of elements of interest from different positions and perspectives, further enabling a user to better and more quickly understand the contents of the environment, which in turn may lead to reduced demands on system capacity.

In accordance with a further development of the first aspect, the position of the virtual camera and the position of said virtual projector, or the orientation of said virtual camera and the orientation of said virtual projector, or the field of view of said virtual camera and the field of view of said virtual projector are in a defined relationship such that a modification with respect to the virtual camera brings a corresponding modification with respect to the virtual projector.

In accordance with a second aspect, there is provided an apparatus adapted to implement the method of any preceding claim.

In accordance with a third aspect, there is provided an apparatus for managing the display of objects having a predefined spatial relationship in a three dimensional computer generated environment with respect to a virtual projector having a specified position, orientation and field of view in the environment, the objects each being associated with a respective metadata value defining the respective visibility of the objects in representations thereof, wherein the apparatus is adapted to determine a display threshold for each object within the field of view of the virtual projector, wherein the display function has an inverse relation to distance from the virtual projector, and wherein the display function further varies as a function of the angle defined by the orientation of the virtual projector and a line drawn from said virtual projector to each said object respectively, and wherein the apparatus is further adapted to cause the display of objects in the field of view objects excluding those not meeting their respective display threshold.

In accordance with a fourth aspect, there is provided computer program adapted to perform the steps of the first aspect.

BRIEF DESCRIPTION OF THE DRAWINGS

The above and other advantages of the present invention will now be described with reference to the accompanying drawings, in which.

DETAILED DESCRIPTION

Figure 2:
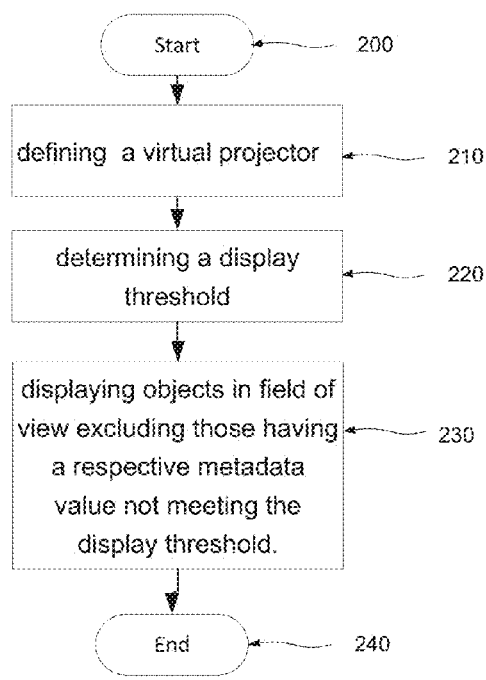
FIG. 2 shows a method according to an embodiment.

FIG. 2 shows a method according to an embodiment. More particularly, FIG. 2 shows steps of a method of displaying objects having a predefined spatial relationship in a three dimensional (3D) computer generated environment such as that described above with regard to FIG. 2.

The three dimensional environment may be defined in any suitable terms, such as for example voxels, polygons (for example in polygon mesh structures), intersecting surfaces (for example NURBS surfaces or subdivision surfaces,) or equation-based representations. By way of example, certain embodiments below will be described in terms of voxel based environments; however the skilled person will appreciate that the described embodiments may be adapted to any of these other environments.

In such an environment, the objects are each associated with a respective metadata value, which can be used to define the respective visibility of said objects in representations thereof. This value may directly define the opacity of the object when displayed, or some other visibility value such brightness or colour, or may reflect a physical characteristic of the real substance represented by the object. For example, where the objects represent components of physical artifacts such as described with respect to FIG. 1, i.e. in the context of a scan representing those artifacts, the metadata value may represent the density of the material in question, which may then be translated into opacity, brightness, etc. when the objects are displayed.

As shown in FIG. 2, the method starts at step 200 before proceeding to step 210 at which a virtual projector is defined in the environment, having a specified position, orientation and field of view in said therein.

The method then proceeds to step 220 of determining a display threshold for each object within the field of view of said virtual projector on the basis of a display function, wherein the display function has an inverse relation to distance from the virtual projector, and wherein the display function further varies as a function of the angle defined by the orientation of the virtual projector and a line drawn from said virtual projector to each said object respectively.

The method then proceeds to step 230 at which objects in said field of view are displayed, excluding those not meeting the respective display threshold before terminating at step 240.

The definition of the display function will clearly have a marked influence on the final objects selected for display.

Figure 3:
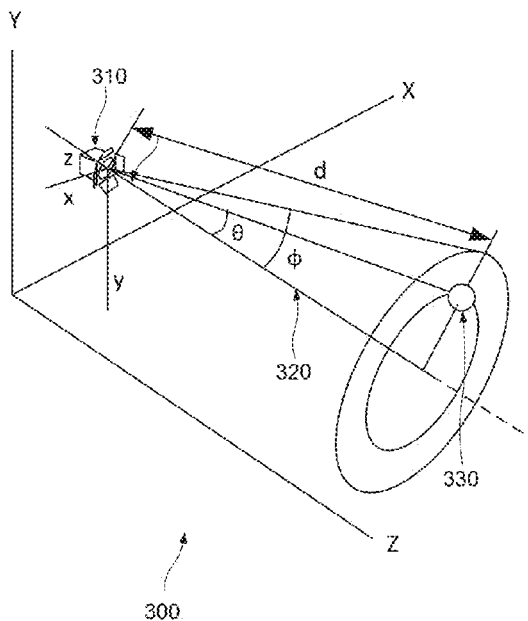
FIG. 3 shows a representation of certain geometric aspects of the display function.

FIG. 3 shows a representation of certain geometric aspects of the display function. As shown in FIG. 3, there is provided a computer generated three dimensional environment 300 represented by the three axes X, Y Z. A virtual projector 310 is defined by a specified position x, y, z, orientation 320 and field of view Φ in the environment. An object 330 is situated at a distance d with respect to the virtual projector, and at an angle θ with respect to the orientation 320 of the virtual projector. As described above, the display function has an inverse relation to distance d from said virtual projector, and further varies as a function of the angle θ defined by the orientation of the virtual projector and a line 320 drawn from the virtual projector 310 to each object 330.

Figure 4:
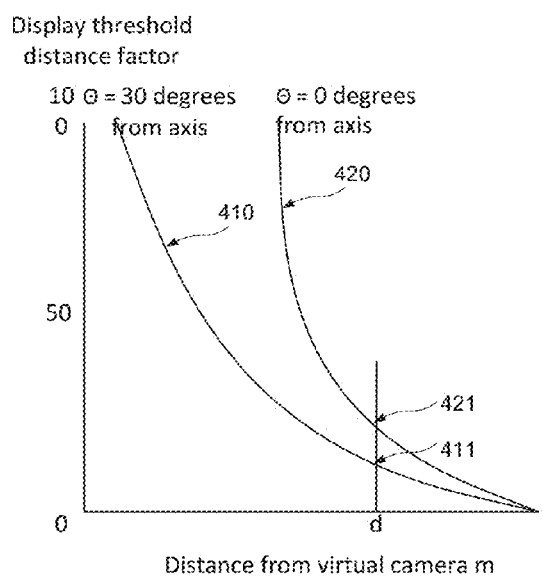
FIG. 4 shows a schematic graphical representation of the display function of certain embodiments.

FIG. 4 shows a schematic graphical representation of the display function of certain embodiments. As described above, the display function has an inverse relation to distance d from said virtual projector, and further varies as a function of the angle θ defined by the orientation of the virtual projector and a line 320 drawn from the virtual projector 310 to each object 330. As such, the display function might be thought of in terms of a family of curves plotting a factor used in defining the display threshold against different possible distances d between the object 330 and the virtual projector 310, with a curve defined for each possible angle θ between the orientation of the virtual projector and a line 320 drawn from the virtual projector 310 to the object 330. FIG. 4 shows a first such curve 410 which for the sake of the present example may represent the relationship between the display threshold and distance d at the an angle of 30° to the orientation of the virtual projector 310, which might correspond to the field of view Φ, the maximum angle an object can define with respect to the virtual projector and still be subject to the display threshold. FIG. 4 shows a second such curve 420 which for the sake of the present example may represent the relationship between the display threshold and distance d at the an angle of 0° to the orientation of the virtual projector 310, the minimum angle an object can define with respect to the virtual projector 310. As such, the remaining curves of the family, or which there may be any number, including an infinite number as discussed below, corresponding to other angles will lie between the first and second curves 410, 420. As shown, the first curve 410 is situated to the right of the second curve 420, indicating that at a given distance d, the threshold value for display 411 will be lower at the periphery of the projector's field of view, than the threshold value for display 421 in the centre of the projector's field of view, so that in general the display function represented in FIG. 4 will tend to exclude objects from display more aggressively near the centre of the field of view.

Thus the display function may tend to a maximum as the angle defined by the axis and each said object falls to zero.

It may be imagined that intermediate curves between the curves 410, 420 might exhibit successive intermediate variants of these curves. As shown, the curves 410, 420 resemble exponential functions falling from maximum values at shorter distances from the virtual projector, and approaching zero as the distance value gets greater, so that in general the display function represented in FIG. 4 will tend to exclude objects from display more aggressively near the close to the virtual projector.

For example, the display function may reflect an inverse square law with respect to distance from the virtual camera.

It will be appreciated that although the display function has been described with respect to FIG. 4 as a set of discrete curves corresponding to specific angles, the display function may also be defined in terms of a continuous function providing display threshold values for all possible values of d and θ.

Figure 5:
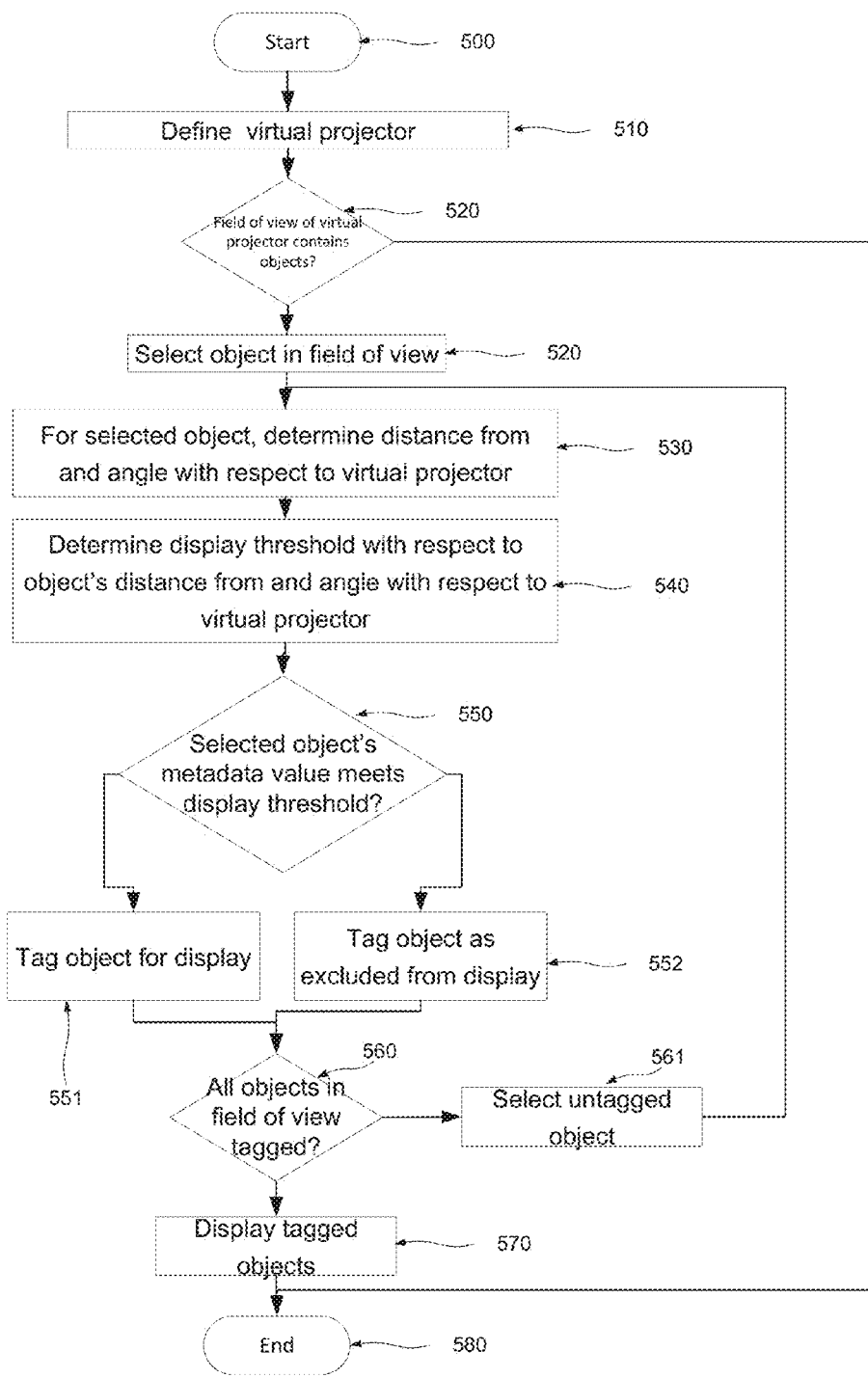
FIG. 5 shows a method according to a further embodiment.

FIG. 5 shows a method according to a further embodiment. The method of FIG. 5 is a method presenting more detailed steps as one possible way of implementing the embodiment of FIG. 2.

As shown, the method starts at step 500 before proceeding to step 510 at which a virtual projector is defined in the environment, having a specified position, orientation and field of view therein. The method then proceeds to step 520 at which it is determined whether the field of view of the virtual projector contains any objects. If the field of view of the virtual projector contains no objects the method terminates at step 580. Otherwise, one of the objects in the field of view is selected at step 520. The object may be selected on any basis—it may be the closest to or furthest from the virtual projector, for example. The method then proceeds to step 530 at which the distance d of the selected object from the virtual projector, and the angle with respect to the virtual projector θ are determined. The method then proceeds to step 540 at which the display threshold corresponding to the angle and distance values evaluated at step 530 is determined. At step 550 the selected object's metadata value is compared to the display threshold, and in a case where the object's metadata value exceeds the display threshold the method proceeds to step 551 at which the object is tagged for display, or otherwise in a case where the object's metadata value does not exceed the display threshold the method proceeds to step 552 at which the object is tagged as excluded from display. In some cases it may be possible for the metadata value to equal the display threshold, in which case the method will classify for display, or not, as appropriate to the specific implementation. After the method passes via step 551 or 552 the method returns to step 560 at which it is determined whether any objects in the field of view of the virtual projector have yet to be assessed with respect to a display threshold. At this step, the set of objects in the field of view may be expanded since objects now tagged as excluded from display can be ignored, which may expose new objects as candidates for display. In a case where one or more objects remain in the field of view of the virtual projector that have not yet been assessed the method selects an new, presently untagged object at step 561 before reverting to step 530. Otherwise, if all objects in the field of view of the virtual projector have been assessed, the method proceeds to step 570 at which the objects in the field of view that have not been tagged as excluded from display are displayed to a user, before the method terminates at step 580. It will be appreciated that the term "tagging" as used here does not imply any particular data structure or recording mechanism, merely that the status of particular objects is flagged, recorded or represented in some manner. In this sense, an object may be treated as being tagged in one way or another implicitly, for example by absence of a tag having the alternative meaning. When the method calls for presenting objects not tagged as excluded, it may equally call for presenting tags that have been tagged for display.

On considering FIGS. 3 and 4 it will be apparent that the behaviour of the display threshold is in some ways analogous to a torch or flashlight. Pursuing this analogy, it may be helpful to consider the angular aspect of the display function.

FIG. 6 shows four possible angular intensity distributions for the display function. In each case, there is presented a polar plot with the radial coordinate representing a percentage of the maximum threshold value at a particular distance from the virtual projector, and the angular coordinate corresponding to the angle θ between the orientation of the virtual projector and a line 320 drawn from the virtual projector 310 to the object 330.

Figure 6A:
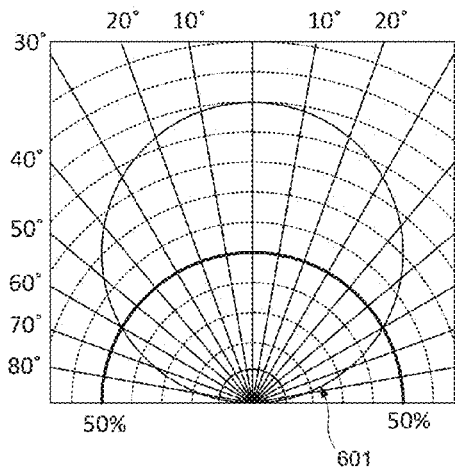
FIG. 6a shows a first angular intensity distribution for the display function.

FIG. 6a shows a first angular intensity distribution for the display function. As shown, the display function angular intensity distribution 601 substantially describes a circle, with 100% display function effect at 0 degrees, falling to 50% at 60 degrees, and zero % at 90 degrees.

Figure 6B:
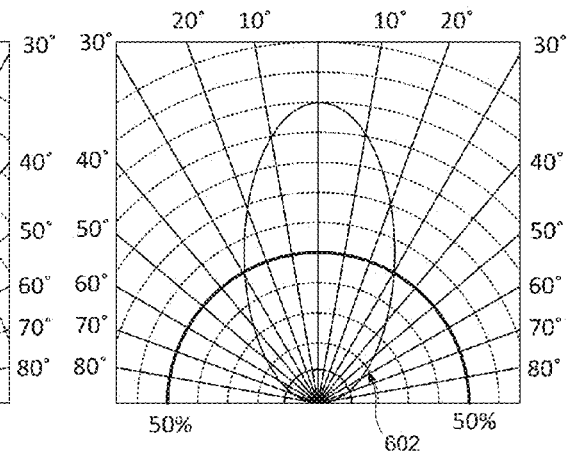
FIG. 6b shows a second angular intensity distribution for the display function.

FIG. 6b shows a second angular intensity distribution for the display function. As shown, the display function angular intensity distribution 602 substantially describes an ellipse, with 100% display function effect at 0 degrees, falling to 50% at 30 degrees, and zero % at 90 degrees. The result is thus a more focussed beam.

While FIGS. 6a and 6b are similar to the types of angular intensity distribution one might expect from a real torch or flashlight, it will be appreciated that any arbitrary form may be defined.

Figure 6C:
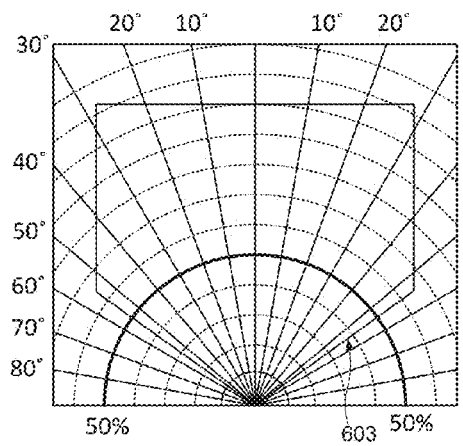
FIG. 6c shows a third angular intensity distribution for the display function.

FIG. 6c shows a third angular intensity distribution for the display function. As shown, the display function angular intensity distribution 603 describes an irregular pentagon, which is symmetrical about the 0 degree line, with 100% display function effect from −27 degrees through 0 degrees to +27 degrees, falling to 65% at 65 degrees, and zero % for angles beyond 65. The result is a beam with no dispersion outside a defined angle, which may tie conveniently to the finite field of view of the virtual projector, although it is also possible for the virtual projector to have a very wide, or even spherical field of view, or for the angular intensity distribution to be wider that the field of view of the virtual projector, with wider angles simply not being used in display function calculations.

Figure 6D:
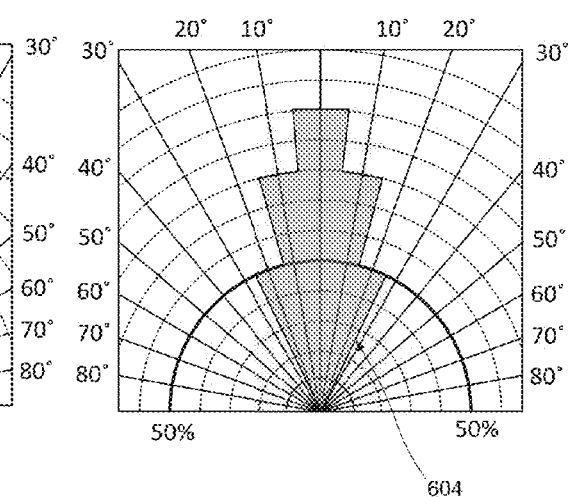
FIG. 6d shows a fourth angular intensity distribution for the display function.

FIG. 6d shows a fourth angular intensity distribution for the display function. As shown, the display function angular intensity distribution 604 describes stepwise function, which sets the display function effect to 100% from −5 degrees through 0 degrees to +5 degrees, falling to 80% between −15 degrees and −5 degrees and between +5 degrees and 15 degrees, falling to 50% between −25 degrees and −15 degrees and between +15 degrees and 25 degrees, and to zero for angles outside 25 degrees. The result is a beam with no dispersion outside a defined angle, which may tie conveniently to the finite field of view of the virtual projector, although it is also possible for the virtual projector to have a very wide, or even spherical field of view, or for the angular intensity distribution to be wider that the field of view of the virtual projector, with wider angles simply not being used in display function calculations.

It will be appreciated that while FIG. 6 shows angular intensity distributions on one dimension, corresponding to an arc, the describe embodiments may be trivially extended to two dimensional distributions corresponding to a cone as required in the context for example of FIG. 3. As discussed in more detail below, it will be appreciated that the distribution may be different in different planes.

FIG. 7 presents a worked example on the basis of the method of FIG. 5 and the angular intensity distributions of FIG. 6d.

For the sake of the present example, the display threshold at 0 degrees is taken to be $1/d^2$, and at other angles the threshold is modified in accordance with FIG. 6d.

Figure 7A:
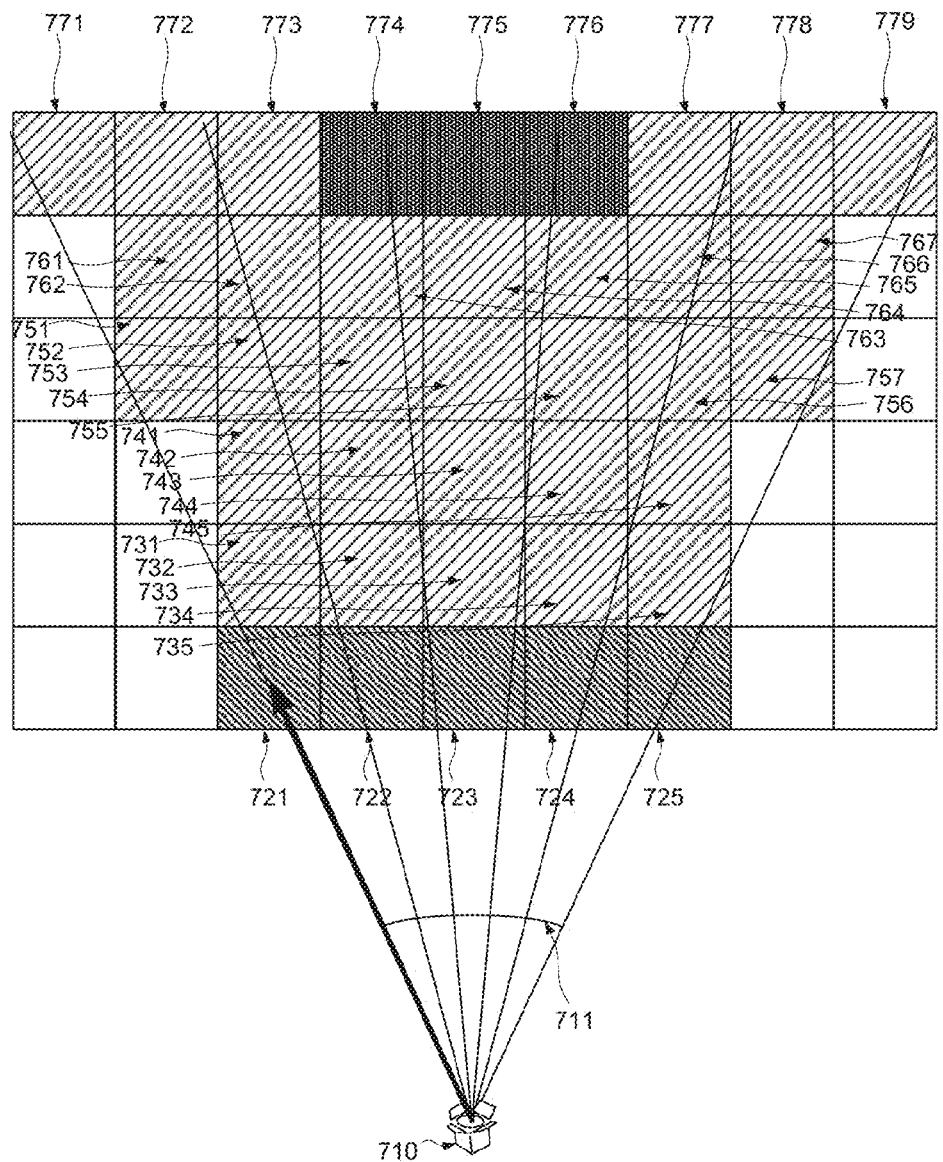
FIG. 7a shows a first stage of an application of an embodiment.

FIG. 7a shows a first stage of an application of an embodiment. As shown in FIG. 7a, there are provided 54 objects in a 6 by 9 matrix. A virtual projector 710 is provided with a field of view 711 of 50 degrees. As shown in FIG. 7a, objects 721, 722, 723, 724 and 725 define a first row of objects in the field of view closest to the virtual projector, 731, 732, 733, 734 and 735 define a second row of objects in the field of view, objects 741, 742, 743, 744 and 745 define a third row of objects in the field of view, 751, 752, 753, 754, 755, 756 and 757 define a fourth row of objects in the field of view, 761, 762, 763, 764, 765, 766 and 767 define a fifth row of objects in the field of view, and 771, 772, 773, 774, 775, 776, 777, 778 and 779 define a sixth, most remote row of objects in the field of view. In accordance with the method of FIG. 5, each of these is considered in turn. The distance and angle values for each object are set out in the table below. The value of the display threshold for each object is furthermore indicated, as determined by multiplying the value of $1/d^2$ by the intensity corresponding to the angle range as obtained from FIG. 6d. The actual density value of each cell is specified, and in cases where the actual density meets or exceeds the threshold, the final column indicates that the object is tagged for display

|  | d | $1/d^2$ | Angle | Intensity % | Threshold | Density | Display |
|---|---|---|---|---|---|---|---|
| 721 | 71 | 0.00020 | −25 to −15 | 50 | 0.00010 | 0.00004 | No |
| 722 | 66 | 0.00023 | −15 to −5 | 80 | 0.00018 | 0.00004 | No |
| 723 | 64 | 0.00024 | −5 to +5 | 100 | 0.00024 | 0.00004 | No |
| 724 | 66 | 0.00023 | +5 to +15 | 80 | 0.00018 | 0.00004 | No |
| 725 | 71 | 0.00020 | +15 to +25 | 50 | 0.00010 | 0.00004 | No |
| 731 | 85 | 0.00014 | −25 to −15 | 50 | 0.00007 | 0.00004 | No |
| 732 | 81 | 0.00015 | −15 to −5 | 80 | 0.00012 | 0.00004 | No |
| 733 | 80 | 0.00016 | −5 to +5 | 100 | 0.00016 | 0.00004 | No |
| 734 | 81 | 0.00015 | +5 to +15 | 80 | 0.00012 | 0.00004 | No |
| 735 | 85 | 0.00014 | +15 to +25 | 50 | 0.00007 | 0.00004 | No |
| 741 | 99 | 0.00010 | −25 to −15 | 50 | 0.00005 | 0.00004 | No |
| 742 | 96 | 0.00011 | −15 to −5 | 80 | 0.00009 | 0.00004 | No |
| 743 | 95 | 0.00011 | −5 to +5 | 100 | 0.00011 | 0.00004 | No |
| 744 | 96 | 0.00011 | +5 to +15 | 80 | 0.00009 | 0.00004 | No |
| 745 | 99 | 0.00010 | +15 to +25 | 50 | 0.00005 | 0.00004 | No |
| 751 | 118 | 0.00007 | −25 to −15 | 50 | 0.00004 | 0.00004 | YES |
| 752 | 114 | 0.00008 | −25 to −15 | 50 | 0.00004 | 0.00004 | YES |
| 753 | 110 | 0.00008 | −15 to −5 | 80 | 0.00006 | 0.00004 | No |
| 754 | 110 | 0.00008 | −5 to +5 | 100 | 0.00008 | 0.00004 | No |
| 755 | 110 | 0.00008 | +5 to +15 | 80 | 0.00006 | 0.00004 | No |
| 756 | 114 | 0.00008 | +15 to +25 | 50 | 0.00004 | 0.00004 | YES |
| 757 | 118 | 0.00007 | +15 to +25 | 50 | 0.00004 | 0.00004 | YES |
| 761 | 132 | 0.00006 | −25 to −15 | 50 | 0.00003 | 0.00004 | YES |
| 762 | 128 | 0.00006 | −15 to −5 | 80 | 0.00005 | 0.00004 | No |
| 763 | 126 | 0.00006 | −15 to −5 | 80 | 0.00005 | 0.00004 | No |
| 764 | 125 | 0.00006 | −5 to +5 | 100 | 0.00006 | 0.00004 | No |
| 765 | 126 | 0.00006 | +5 to +15 | 80 | 0.00005 | 0.00004 | No |
| 766 | 128 | 0.00006 | +5 to +15 | 80 | 0.00005 | 0.00004 | No |
| 767 | 132 | 0.00006 | +15 to +25 | 50 | 0.00003 | 0.00004 | YES |
| 771 | 152 | 0.00004 | −25 to −15 | 50 | 0.00002 | 0.00004 | YES |
| 772 | 147 | 0.00005 | −25 to −15 | 50 | 0.00003 | 0.00004 | YES |
| 773 | 143 | 0.00005 | −15 to −5 | 80 | 0.00004 | 0.00004 | YES |
| 774 | 141 | 0.00005 | −15 to −5 | 80 | 0.00004 | 0.00010 | YES |
| 775 | 140 | 0.00005 | −5 to +5 | 100 | 0.00005 | 0.00010 | YES |
| 776 | 141 | 0.00005 | +5 to +15 | 80 | 0.00004 | 0.00010 | YES |
| 777 | 143 | 0.00005 | +5 to +15 | 80 | 0.00004 | 0.00004 | YES |
| 778 | 147 | 0.00005 | +15 to +25 | 50 | 0.00003 | 0.00004 | YES |
| 779 | 152 | 0.00004 | +15 to +25 | 50 | 0.00002 | 0.00004 | YES |

Figure 7B:
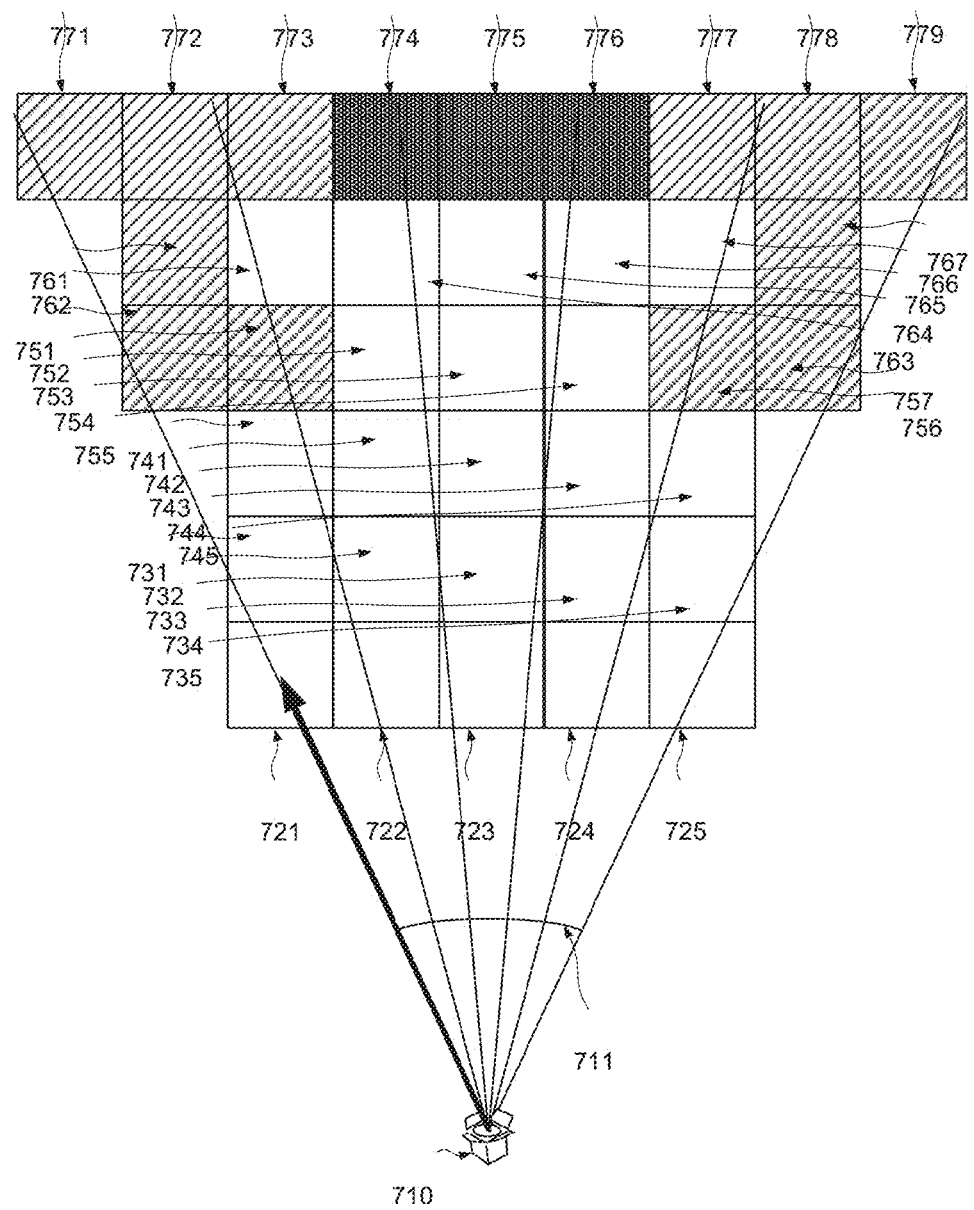
FIG. 7b shows the results of an application of an embodiment.

FIG. 7*b* shows the results of an application of an embodiment. As shown in FIG. 7*b*, the objects 721, 722, 723, 724, 725, 731, 732, 733, 734, 735, 741, 742, 743, 744, 745, 751, 752, 753, 754, 755, 756, 757, 761, 762, 763, 764, 765, 766, 767, 771, 772, 773, 774, 775, 776, 777, 778 and 779 are isolated from the surrounding objects not in the field of view of the projector. The objects determined with respect to FIG. 7*a* to meet or exceed the display threshold retain their shading, whilst the cells not meeting the display threshold are un-shaded. Accordingly when the objects are displayed to the user he will be able to see into the group of objects, through to the denser set of objects 774, 775, 76 which would ordinarily be buried out of sight by the surrounding objects.

While FIGS. 7*a* and 7*b* have been described for the sake of simplicity in the context of a two dimensional matrix of objects, it will be appreciated that the same exercise could be carried out with respect to a three dimensional matrix.

Figure 8:
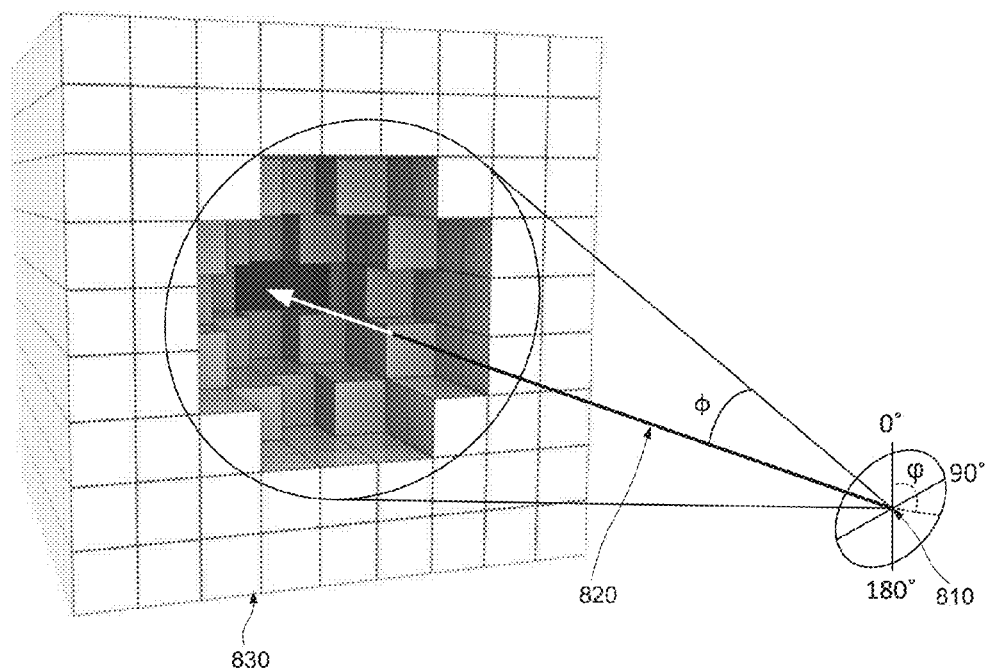
FIG. 8 shows the expansion of the embodiment of FIGS. 7a and 7b in a three dimensional context.

FIG. 8 shows the expansion of the embodiment of FIG. 7 in a three dimensional context. The position of the virtual projector 810 is shown, with orientation 820. A 9×9×9 matrix of objects 830 is shown, with a number of objects close to the orientation axis 820 being excluded from display. The objects displayed in a horizontal plane intersecting the axis 820 and in a vertical plane intersecting the axis 820 correspond to the objects retained for display in FIG. 7*b*. Other objects are excluded from display on the basis of a rotational application of the display function in the planes intersecting those objects and the axis 820.

It will be appreciated that the display function may determine different thresholds in different planes. In FIG. 8, the virtual projector 810 is shown associated with polar axes orthogonal the axis 820. The horizontal plane intersecting the axis 820 and vertical plane intersecting the axis 820 are at 90 degrees and 0 degrees respectively, and other planes may be defined at any arbitrary angle φ with respect to these polar axes. On this basis the display function may comprise an additional angular component φ such that the function need not be rotationally symmetrical.

Still further, the transfer function need not be defined as a continuous function, but rather as a set of discrete thresholds.

It will be appreciated that there may be defined a plurality of candidate display functions, which may implement any combination of the different variations proposed for the definition of the display function as set out above, or otherwise. For example, respective candidate display functions may implement different angular intensity distributions such as described with respect to FIG. 6, different treatments of the distance variable, for example on the basis of an exponential decay, polynomial curve, etc, different thresholds in different planes as described with reference to FIG. 7, and so on. The candidate display functions may implement any combination of these different variables, and may support individual selection of these variables. The different variables may be combined with different weightings so that the effect of each on the results can be modulated. In particular, the distance variable may be subject to a scaling term, having a multiplying effect on the threshold values, so as to render more or less penetrating the effect of the virtual projector.

Accordingly, there may be provided a further method step of receiving a user input specifying the candidate display function to be applied as said display function, such as the scaling term, or any display function characteristic or any combination of display function characteristics.

Furthermore there may be provided a further method step of automatically selecting the candidate display function to be applied as said display function, such as the scaling term, or any display function characteristic or any combination of display function characteristics, on the basis of suitable predefined criteria. For example, the method may attempt to identify coherent objects lying within the field of view of the virtual projector, and select a display function which tends to makes any such objects either wholly visible, or wholly obscured, and thus tends to minimise the display of partial objects.

Accordingly, there may be provided a further method step of selecting the candidate display function to be applied as said display function.

Generally speaking, the objects selected for display in a three dimensional environment are determined by the position, orientation and field of view of a virtual camera. In the foregoing description, for the sake of simplicity, it is assumed that the virtual camera settings will not affect the implementation of the virtual projector effect, for example where the position of the virtual camera is the same as the position of the virtual projector, the orientation of the virtual camera is aligned with that of the virtual projector and field of view of the virtual camera is broader than or equal to that of the virtual projector. As such, the position of the virtual camera and the position of the virtual projector, or the orientation of said virtual camera and the orientation of said virtual projector, or the field of view of said virtual camera and the field of view of said virtual projector may be in a defined relationship such that a modification with respect to the virtual camera brings a corresponding modification with respect to the virtual projector.

Thus the virtual projector and virtual camera may be locked together, so that the centre of the representation displayed to the user is subject to the effect of the virtual projector, which scans across the environment as the user moves the virtual camera.

Nevertheless, many departures from this arrangement may be envisaged. Any, all, or none of the position, orientation and field of view of the virtual camera and virtual projector may be locked together. In some cases, the two may be entirely independent. Where the degree of independence between the virtual projector and virtual camera is such that the field of view of the projector affects objects that are outside the field of view of the virtual camera, there may be provided an additional step, for example prior to the step 520 of FIG. 5, of determining whether the projector affects any objects that are outside the field of view of the virtual camera, and if so excluding this objects from display ab initio. Accordingly, at the step of displaying, objects in the field of view of said virtual camera are displayed excluding those not meeting respective said display threshold.

Accordingly, there may furthermore be provided an additional step of receiving a user input determining the orientation, position or field of view of either said virtual camera or said virtual projector, or any combination of these.

It will also be appreciated that there may be defined a plurality of virtual projectors as described above, with various position, orientation and field of view settings, in the same environment.

Figure 9:
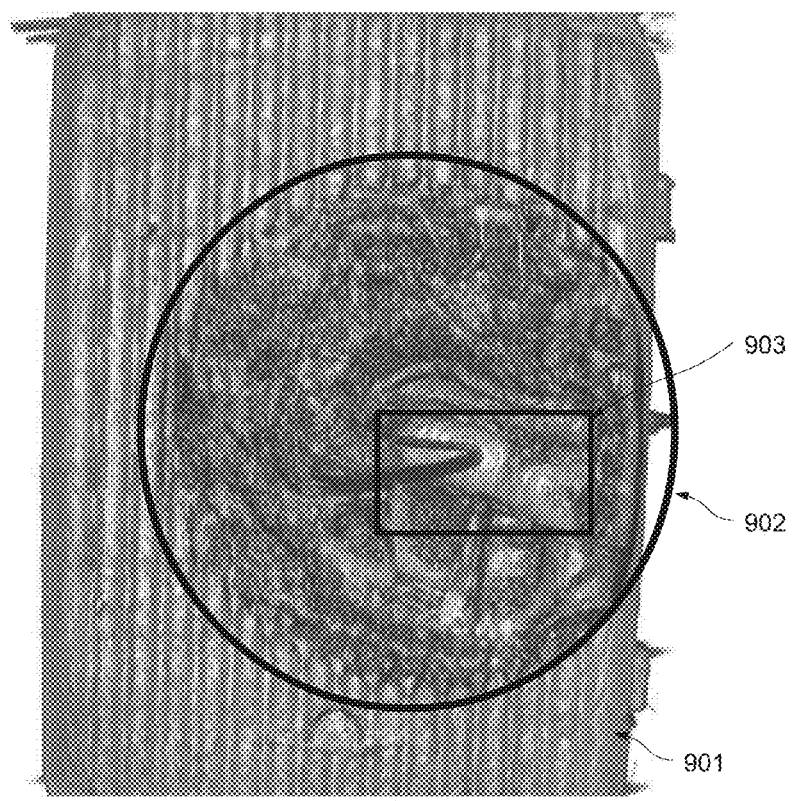
FIG. 9 shows the application of an embodiment to a real image.

FIG. 9 shows the application of an embodiment to a real image.

Figure 1:
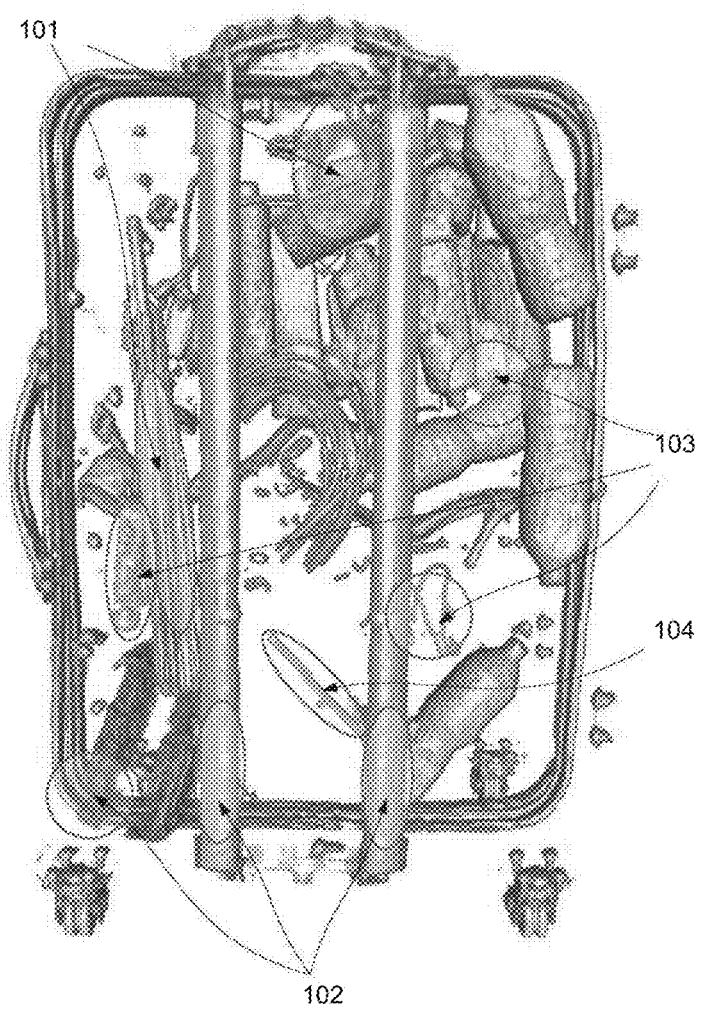
FIG. 1 demonstrates some of the ways in which an article may be obscured in a scan.

FIG. 9 shows a section of a suitcase 901 in a context similar to that described with respect to FIG. 1. While generally the outer skin of the suitcase is displayed, obscuring the contents of the suitcase, within the circle 902 corresponding to the field of view of the virtual projector the view of the user penetrates into the content of the suitcase in the manner described with respect to the foregoing embodiments, revealing a bottle 903 which would otherwise have been invisible. The user may cause the circle 902 corresponding to the field of view of the virtual projector to move over the surface of the suitcase so as to review its contents, without the coherence of the object as a whole being compromised. By this means the user retains a strong intuitive understanding of the interrelationship between the objects in the suitcase, and their relative contexts. In this particular case, the virtual projector (not shown) is fixed in a plane at the same distance from the suitcase as the virtual camera, and with the same orientation as the virtual camera, but may be moved by the user or automatically around that plane to render visible different zones in the virtual camera's field of view. The user may also select different display functions, and in particular vary the distance scaling term so as to display deeper or shallower parts of the suitcase.

Accordingly, to better explore a virtual 3D computer generated environment comprised of objects which may be voxels, polygons or any other construct are selectively not displayed so as to better reveal underlying objects. The objects are each associated with a metadata value which contributes to determining their visibility such as a density or opacity value. The manner of selection is somewhat analogous to the projection of a beam of light towards the objects from a virtual projector, where a display threshold is determined for each object within the field of view of said virtual projector on the basis of a display function having an inverse relation to distance from the virtual projector and further varying as a function of the angle defined by the orientation of the virtual projector and a line drawn from said virtual projector to each said object respectively. On this basis, objects having a smaller angular separation from the axis of the virtual projector, and closer to the projector, will be preferentially excluded from display.

The disclosed methods can take form of an entirely hardware embodiment (e.g.

FPGA), an entirely software embodiment (for example to control a system according to the invention) or an embodiment containing both hardware and software elements. As such, embodiments may comprise a number of subsystems, functional elements or means adapted to implement the invention in communication with each other, and/or with standard fixed function or programmable elements for example as described below.

On this basis, there is provided an apparatus for managing the display of objects having a predefined spatial relationship in a three dimensional computer generated environment with respect to a virtual projector having a specified position, orientation and field of view in said environment, the objects each being associated with a respective metadata value defining the respective visibility of said objects in representations thereof. The apparatus is further adapted to determine a display threshold for each object within the field of view of the virtual projector, wherein said display function has an inverse relation to distance from said virtual projector, and wherein said display function further varies as a function of the angle defined by the orientation of the virtual projector and a line drawn from said virtual projector to each said object respectively, and wherein said apparatus is further adapted to cause the display of objects in said field of view objects excluding those not meeting their respective said display threshold.

Similarly, there is provided an apparatus adapted to perform the steps of any of the methods described above, for example with respect to FIG. 2, or FIG. 5.

Software embodiments include but are not limited to applications, firmware, resident software, microcode, etc. The invention can take the form of a computer program product accessible from a computer-usable or computer-readable medium providing program code for use by or in connection with a computer or an instruction execution system.

A computer-usable or computer-readable can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

In some embodiments, the methods and processes described herein may be implemented in whole or part by a user device. These methods and processes may be implemented by computer-application programs or services, an application-programming interface (API), a library, and/or other computer-program product, or any combination of such entities.

The user device may be a mobile device such as a smart phone or tablet, a drone, a computer or any other device with processing capability, such as a robot or other connected device.

Figure 10:
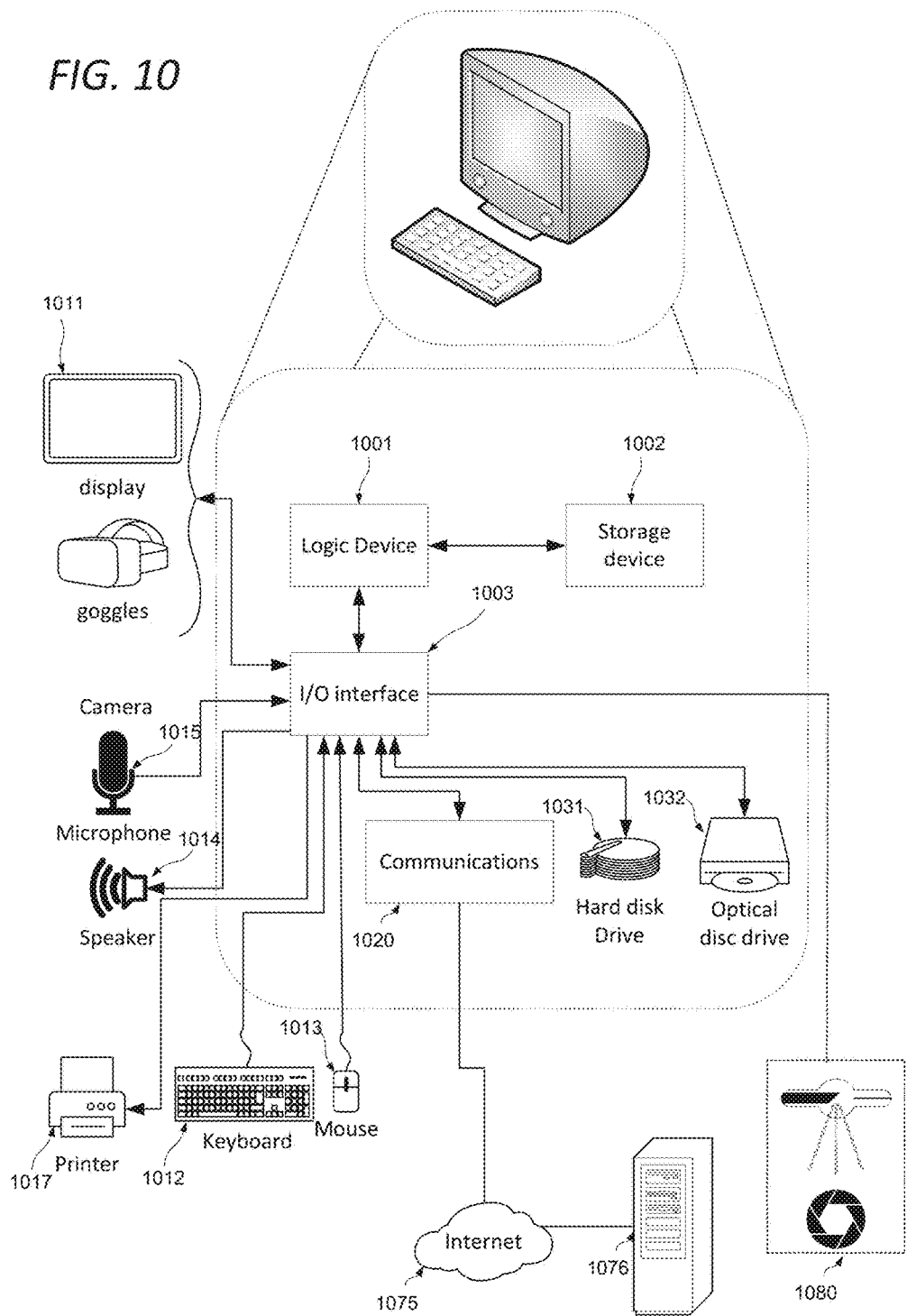
FIG. 10 shows a generic computing system suitable for implementation of embodiments of the invention.

FIG. 10 shows a generic computing system suitable for implementation of embodiments of the invention.

A shown in FIG. 10, a system includes a logic device 1001 and a storage device 1002. The system may optionally include a display subsystem 1011, input/output subsystem 1003, communication subsystem 1020, and/or other components not shown.

Logic device 1001 includes one or more physical devices configured to execute instructions. For example, the logic device 1001 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic device 1001 may include one or more processors configured to execute software instructions. Additionally or alternatively, the logic device may include one or more hardware or firmware logic devices configured to execute hardware or firmware instructions. Processors of the logic device may be single-core or multi-core, and the instructions executed thereon may be configured for sequential, parallel, and/or distributed processing. Individual components of the logic device 1001 optionally may be distributed among two or more separate devices, which may be remotely located and/or configured for coordinated processing. Aspects of the logic device 1001 may be virtualized and executed by remotely accessible, networked computing devices configured in a cloud-computing configuration.

Storage device 1002 includes one or more physical devices configured to hold instructions executable by the logic device to implement the methods and processes described herein. When such methods and processes are implemented, the state of storage 1002 device may be transformed—e.g., to hold different data.

Storage device 1002 may include removable and/or built-in devices. Storage device may be locally or remotely stored (in a cloud for instance). Storage device 602 may comprise one or more types of storage device including optical memory (e.g., CD, DVD, HD-DVD, Blu-Ray Disc, etc.), semiconductor memory (e.g., FLASH, RAM, EPROM, EEPROM, etc.), and/or magnetic memory (e.g., hard-disk drive, floppy-disk drive, tape drive, MRAM, etc.), among others. Storage device may include volatile, non-volatile, dynamic, static, read/write, read-only, random-access, sequential-access, location-addressable, file-addressable, and/or content-addressable devices.

In certain arrangements, the system may comprise an interface 1003 adapted to support communications between the Logic device 1001 and further system components. For example, additional system components may comprise removable and/or built-in extended storage devices. Extended storage devices may comprise one or more types of storage device including optical memory 1032 (e.g., CD, DVD, HD-DVD, Blu-Ray Disc, etc.), semiconductor memory (not shown) (e.g., RAM, EPROM, EEPROM, FLASH etc.), and/or magnetic memory 1031 (e.g., hard-disk drive, floppy-disk drive, tape drive, MRAM, etc.), among others. Such extended storage device may include volatile, non-volatile, dynamic, static, read/write, read-only, random-access, sequential-access, location-addressable, file-addressable, and/or content-addressable devices.

It will be appreciated that storage device includes one or more physical devices, and excludes propagating signals per se. However, aspects of the instructions described herein alternatively may be propagated by a communication medium (e.g., an electromagnetic signal, an optical signal, etc.), as opposed to being stored on a storage device.

Aspects of logic device 1001 and storage device 1002 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system implemented to perform a particular function. In some cases, a program may be instantiated via logic device executing machine-readable instructions held by storage device. It will be understood that different modules may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

In particular, the system of FIG. 10 may be used to implement embodiments of the invention.

For example a program implementing the steps described with respect to FIG. 2 or FIG. 5 may be stored in storage device 1002 and executed by logic device 1001. Data used for the creation of the graphical representation of the objects and their associated scalar metadata may be stored in storage 1002 or the extended storage devices 1032 or 1031 and the display 1011 used to display the graphical representation.

In some cases, the computing system may comprise or be in communication with a scanner 1080 or other three dimensional imaging system as described above. This communication may be achieved by wired or wireless network, serial bus, Firewire, Thunderbolt, SCSI or any other communications means as desired. In such cases, a program for the control of the scanner 1080 and/or the retrieval of data therefrom may run concurrently on the logic device 1001, or these features may be implemented in the same program as implementing the steps described with respect to FIG. 2 or 5.

Accordingly the invention may be embodied in the form of a computer program.

Furthermore, when suitably configured and connected, the elements of FIG. 10 may constitute an apparatus adapted to generate a graphical representation of a dataset, and cause a display device to display said representation; this apparatus may further be adapted to receive data from an eye tracking system indicating a point of regard. The apparatus may comprise storage for compiling a record of the point of regard over a duration, and the apparatus may further be adapted to modify the graphical representation to indicate the proportion of the duration for which said point of regard was directed at each point in said representation. This point of regard may then be assimilated to the selected point and/or the cursor as described above.

It will be appreciated that a "service", as used herein, is an application program executable across multiple user sessions. A service may be available to one or more system components, programs, and/or other services. In some implementations, a service may run on one or more server-computing devices.

When included, display subsystem 1011 may be used to present a visual representation of data held by a storage device. This visual representation may take the form of a graphical user interface (GUI). As the herein described methods and processes change the data held by the storage device 1002, and thus transform the state of the storage device 1002, the state of display subsystem 1011 may likewise be transformed to visually represent changes in the underlying data. Display subsystem 1011 may include one or more display devices utilizing virtually any type of technology for example as discussed above. Such display devices may be combined with logic device and/or storage device in a shared enclosure, or such display devices may be peripheral display devices.

When included, input subsystem may comprise or interface with one or more user-input devices such as a keyboard 1012, mouse 1013, touch screen 1011, or game controller (not shown). In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, colour, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1020 may be configured to communicatively couple computing system with one or more other computing devices. For example, communication module of may communicatively couple computing device to remote service hosted for example on a remote server 1076 via a network of any size including for example a personal area network, local area network, wide area network, or internet. Communication subsystem may include wired and/or wireless communication devices compatible with one or more different communication protocols. As non-limiting examples, the communication subsystem may be configured for communication via a wireless telephone network 1074, or a wired or wireless local- or wide-area network. In some embodiments, the communication subsystem may allow computing system to send and/or receive messages to and/or from other devices via a network such as Internet 1075. The communications subsystem may additionally support short range inductive communications with passive or active devices (NFC, RFID etc).

Figure 11:
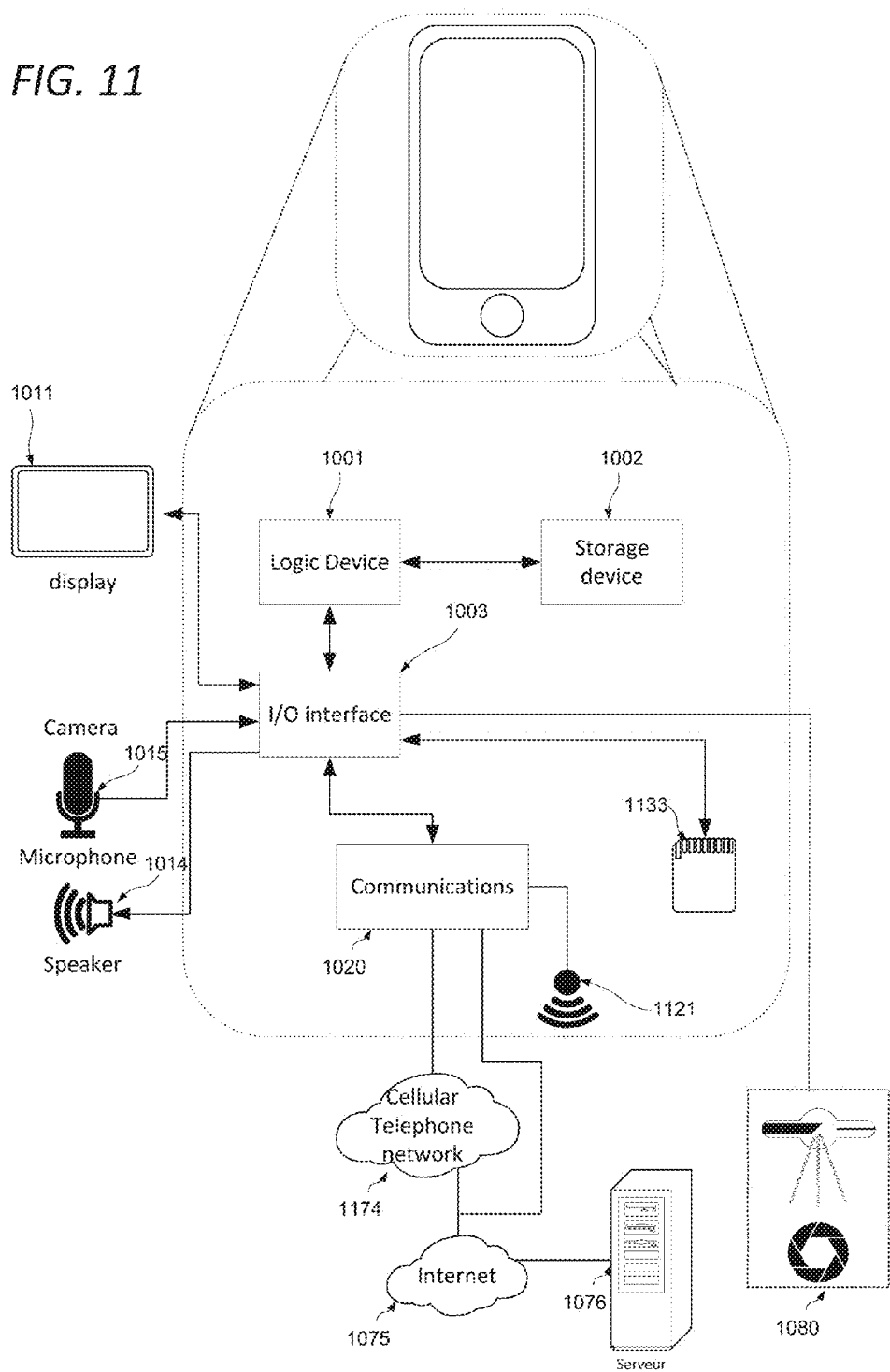
FIG. 11 shows a smartphone device adaptable to constitute an embodiment.
Figure 12:
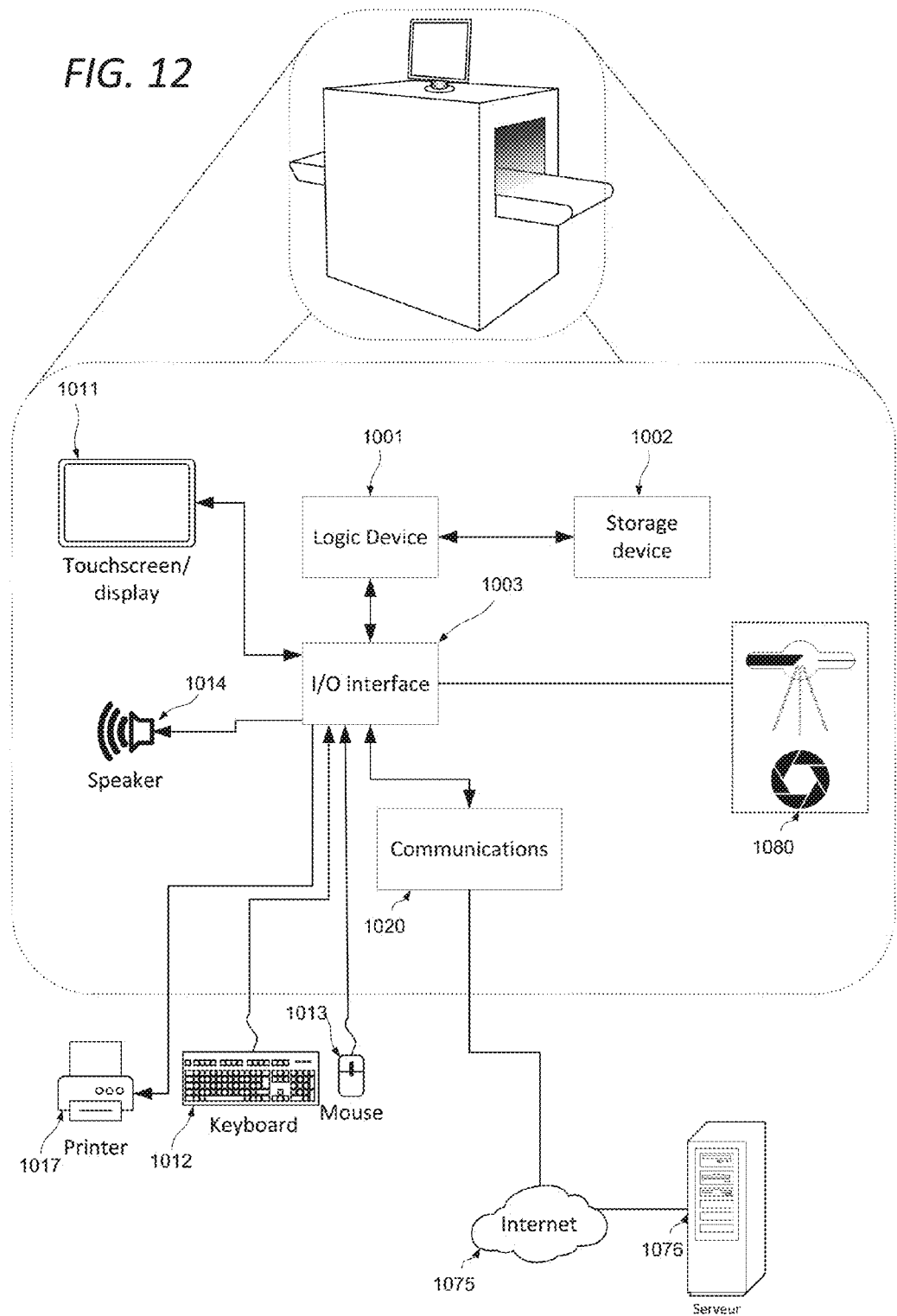
FIG. 12 shows an object scanner system adaptable to constitute an embodiment.
Figure 13:
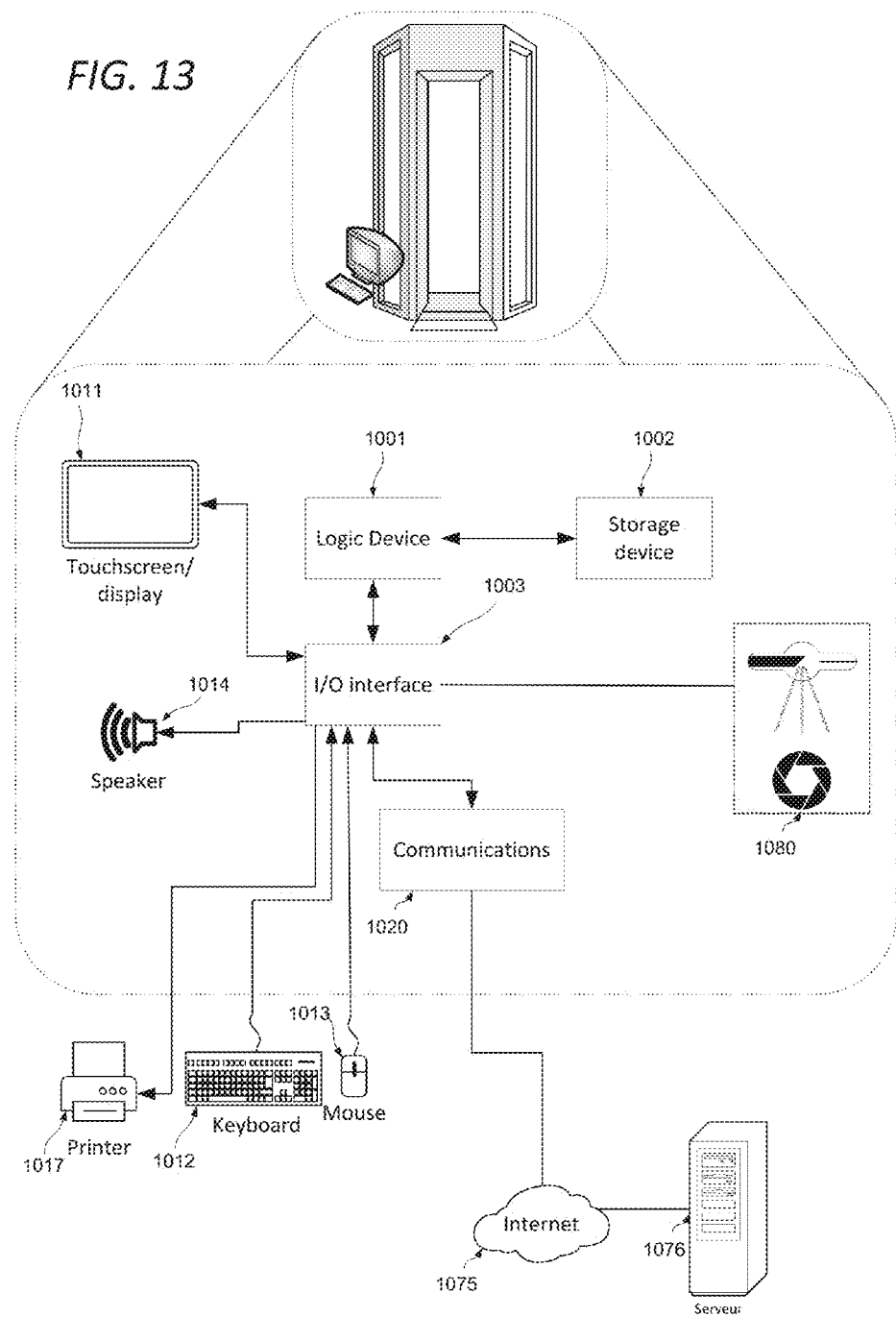
FIG. 13 shows a body scanner system adaptable to constitute an embodiment.

The system of FIG. 10 is intended to reflect a broad range of different types of information handling system. It will be appreciated that many of the subsystems and features described with respect to FIG. 10 are not required for implementation of the invention, but are included to reflect possible systems in accordance with the present invention. It will be appreciated that system architectures vary widely, and the relationship between the different sub-systems of FIG. 10 is merely schematic, and is likely to vary in terms of layout and the distribution of roles in systems. It will be appreciated that, in practice, systems are likely to incorporate different subsets of the various features and subsystems described with respect to FIG. 10. FIGS. 11, 12 and 13 disclose further example devices in accordance with the present invention. Those of ordinary skill in the art will appreciate that systems may be employed in the future which also operate in accordance with the present invention.

FIG. 11 shows a smartphone device adaptable to constitute an embodiment. As shown in FIG. 11, the smartphone device incorporates elements 1001, 1002, 1003, 1020, near field communications interface 1121, flash memory 1133, elements 1014, 1015, and 1011 as described above. It is in communication with the telephone network 1174 and a server 1076 via the network 1075. Alternative communication mechanisms such as a dedicated network or Wi-Fi may also be used. The device may also be in communication with the scanner device 1080. The features disclosed in this figure may also be included within a tablet device as well.

FIG. 12 shows an object scanner system adaptable to constitute an embodiment. This is representative of the devices used in airports and the like for scanning baggage and other articles for concealed weapons or contraband. As shown in FIG. 12, object scanner system comprises elements 1001, 1002, 1003, 1020, 1014 and 1017 as described above. It may be in communication with a server 1076 via the network 1075. Alternative communication mechanisms such as a dedicated network or Wi-Fi may also be used. The device is also in communication with the scanner hardware 1080.

FIG. 13 shows a body scanner system adaptable to constitute an embodiment. This is representative of the devices used in airports, train stations, and the like for scanning individuals for concealed weapons or contraband. As shown in FIG. 13, object scanner system comprises elements 1001, 1002, 1003, 1020, 1014 and 1017 as described above. It may be in communication with a server 1076 via the network 1075. Alternative communication mechanisms such as a dedicated network or Wi-Fi may also be used. The device is also in communication with the scanner hardware 1080.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of displaying objects having a predefined spatial relationship in a three dimensional computer generated environment, said objects each being associated with a respective metadata value defining a respective visibility of said objects in representations of said objects, said method comprising:

defining a virtual projector in said three dimensional computer-generated environment having a specified position, orientation and field of view therein, determining a set of field of view objects from said objects that are within said field of view of said virtual projector, determining a display threshold for each object from said set of field of view objects on a basis of a display function, wherein said display function has an inverse relation to a distance from said virtual projector, and wherein said display function further varies as a function of an angle defined by an orientation of said virtual projector and a line drawn from said virtual projector to each object from said set of field of view objects respectively, comparing said respective metadata value of each object from said set of field of view objects to said determined display threshold for each object from said set of field of view objects, and displaying said set of field of view objects excluding those objects not meeting their respective determined display thresholds.

2. The method of claim 1 in which said respective metadata value represents a density of each respective object of said objects.

3. The method of claim 2 in which said objects are voxels.

4. The method of claim 2 in which said objects are polygons.

5. The method of claim 2 in which said objects are defined by intersecting surfaces.

6. The method of claim 1 in which said display function reflects an inverse square law with respect to said distance from said virtual projector.

7. The method of claim 1 wherein said display function tends to a maximum as said angle defined by an axis and each object from said set of field of view objects falls to zero.

8. The method of claim 1 in which there are defined a plurality of candidate display functions, and comprising a further step of selecting one of said plurality of candidate display functions to be applied as said display function.

9. The method of claim 1 wherein said display function comprises a scaling term, and wherein the method comprises a further step of receiving a user input determining a value of said scaling term.

10. The method of claim 1 wherein there is defined a virtual camera, wherein a position of said virtual camera is the same as said specified position of said virtual projector, and an orientation and a field of view of said virtual camera are such as to overlap with said specified orientation and said specified field of view of said virtual projector, and wherein at said step of displaying, objects in said field of view of said virtual camera are displayed excluding those objects not meeting their respective said determined display thresholds.

11. The method of claim 10 further comprising receiving an external input determining said orientation, said position or said field of view of said virtual camera; or said specified orientation, said specified position or said specified field of view of said virtual projector.

12. The method of claim 11 wherein said position of said virtual camera and said specified position of said virtual projector, or said orientation of said virtual camera and said specified orientation of said virtual projector, or said field of view of said virtual camera and said specified field of view of said virtual projector are in a defined relationship such that a modification with respect to said virtual camera brings a corresponding modification with respect to said virtual projector.

13. An apparatus for managing a display of objects having a predefined spatial relationship in a three dimensional computer generated environment with respect to a virtual projector having a specified position, orientation and field of view in said three dimensional computer generated environment, said objects each being associated with a respective metadata value defining a respective visibility of said objects in representations of said objects, comprising:

a processor, and a non-transitory computer storage medium for storing a computer program for execution by said processor, wherein said processor is adapted to determine a set of field of view objects from said objects that are within said field of view of said virtual projector, wherein said processor is adapted to determine a display threshold for each object from said set of field of view objects on a basis of a display function, wherein said display function has an inverse relation to a distance from said virtual projector, and wherein said display function further varies as a function of an angle defined by an orientation of said virtual projector and a line drawn from said virtual projector to each object from said set of field of view objects respectively, wherein said processor is adapted to compare said respective metadata value of each object from said set of field of view objects to said determined display threshold for each object from said set of field of view objects, and wherein said processor is further adapted to cause said display of said set of field of view objects excluding those objects not meeting their respective determined display thresholds.

14. A computer program product for displaying objects having a predefined spatial relationship in a three dimensional computer generated environment, said objects each being associated with a respective metadata value defining a respective visibility of said objects in representations of said objects, comprising computing instructions stored in a non-transitory computer storage medium for:

defining a virtual projector in said three dimensional computer-generated environment having a specified position, orientation and field of view therein, determining a set of field of view objects from said objects that are within said field of view of said virtual projector, determining a display threshold for each object from said set of field of view objects on a basis of a display function, wherein said display function has an inverse relation to a distance from said virtual projector, and wherein said display function further varies as a function of an angle defined by an orientation of said virtual projector and a line drawn from said virtual projector to each object from said set of field of view objects respectively, comparing said respective metadata value of each object from said set of field of view objects to said determined display threshold for each object from said set of field of view objects, and displaying said set of field of view objects excluding those objects not meeting their respective determined display thresholds.

* * * * *